United States Patent [19]

Janz

[11] Patent Number: 5,241,430
[45] Date of Patent: Aug. 31, 1993

[54] METHOD AND APPARATUS FOR ALTERNATIVELY READING OR WRITING DATA TO A SERVO SURFACE OF A HARD DISK DRIVE

[75] Inventor: Donald W. Janz, Oklahoma City, Okla.

[73] Assignee: Seagate Technology, Inc., Scotts Valley, Calif.

[21] Appl. No.: 593,668

[22] Filed: Oct. 5, 1990

[51] Int. Cl.⁵ .......................... G11B 15/12; G11B 5/09
[52] U.S. Cl. ........................................ 360/62; 360/46
[58] Field of Search ...................... 360/61, 62, 67, 46

[56] References Cited

U.S. PATENT DOCUMENTS

| | | | |
|---|---|---|---|
| 4,665,446 | 5/1987 | Takayama | 360/62 |
| 4,797,754 | 1/1989 | Sugano et al. | 360/53 |
| 4,860,259 | 8/1989 | Tobita | 365/201 |
| 4,912,576 | 3/1990 | Janz | 360/77.07 |
| 5,016,122 | 5/1991 | Meunier et al. | 360/62 |

Primary Examiner—Aristotelis Psitos
Assistant Examiner—Won Tae C. Kim
Attorney, Agent, or Firm—Edward P. Heller, III; Bill D. McCarthy; Louis W. Watson

[57] ABSTRACT

A circuit for enabling the writing of servo data by a servo transducer to a dedicated servo surface of a hard disk drive during the manufacture of the drive while enabling only the reading of servo data at subsequent times that the drive is mated to a computer. The circuit receives power on selected terminals of a connector and includes a level detector that provides a first control signal in response to a power supply voltage level that is below a level selected to exceed voltage levels available from the power supply of a user computer and a second control signal in response to a power supply voltage above the selected level. The second control signal is transmitted to a switch assembly that responds by providing a direct connection between the servo transducer and data terminals of the connector. The first control signal is transmitted to switches by means of which an amplifier, having inputs connected to the transducer and outputs connected to the data terminals, is supplied with electrical power. Servo patterns are written at the time of manufacture of the hard disk drive by operating the circuit from a power supply that provides a voltage level that exceeds the selected level and are read by operating the circuit from the computer power supply.

2 Claims, 2 Drawing Sheets

METHOD AND APPARATUS FOR ALTERNATIVELY READING OR WRITING DATA TO A SERVO SURFACE OF A HARD DISK DRIVE

BACKGROUND OF THE INVENTION

1. Field of the Invention.

The present invention relates generally to improvements in hard disk drives, and, more particularly, but not by way of limitation to improvements in writing servo data to dedicated servo surfaces read by servo transducers for following tracks along which data is stored in the drive.

2. Brief Description of the Prior Art

In hard disk drives used for storing data generated by a computer, the data is written to concentric data tracks defined in magnetizable coatings on the surfaces of rotating disks and is subsequently read therefrom by read/write transducers that are positioned adjacent the surfaces of the disks. The disks are mounted on a common spindle and the read/write transducers are mounted on a common electromechanical actuator that moves the transducers across the disks so that a selected data track can be acquired and subsequently followed using a servo system that reads servo patterns written to the disks and provides positioning signals to the actuator. In one servo system in common use, the servo patterns are written on servo tracks on one disk surface, a dedicated servo surface, at the time of manufacture of the hard disk drive and the servo and data tracks are arranged in concentric cylinders so that following of a data track by a read/write transducer can be effected by following of the servo track in the same cylinder by the transducer, referred to as a servo transducer, adjacent the dedicated servo surface.

As will be clear to those of skill in the art, the integrity of the servo patterns on the dedicated servo surface is critical to the operation of the hard disk drive. For example, should a user's computer access the dedicated servo surface and write data to it, the servo system would no longer be able to properly position the actuator for data track acquisition and following and the drive would become inoperable. In the past, such access has been prevented by preventing a direct connection between the user's computer and the servo transducer, necessary for writing to servo surface, from being made. To this end, the location of the disks, transducers and actuator in a sealed housing that is provided to prevent dust or smoke particles from collecting on the disks and being driven into the transducers which fly only a small distance above the disk surfaces was exploited. Specifically, a connector that was utilized to provide an electrical connection between disk drive circuitry used during writing to the dedicated servo surface was placed within the case so that the user of the disk drive could not access the dedicated servo surface for writing by any electrical connection that might be made to the hard disk drive. Rather, the sole connection that the user might make to the servo transducer was at the output of an amplifier that amplifies data read from the servo surface. Hence, no possibility of writing to the servo surface, after the disk drive left the manufacturer, existed.

A problem with this scheme for isolating the dedicated servo surface with respect to writing is that the housing must be open, to provide access to the connector, during writing of the servo patterns. However, writing the servo patterns while the housing is open presents a second problem. Since the collection of dust and smoke particles on the disks must be avoided, the housing can be opened only in a very clean environment that is not only costly to provide but is an inconvenience to the person writing the servo pattern. In the past, these limitations have been accepted because of the manner in which the actuator was positioned during writing of the servo patterns; specifically, a stepping motor was attached to the actuator and used to position the servo transducer during writing of the patterns. However, it has recently been recognized that the actuator can be positioned for writing servo patterns by alternately writing servo patterns on the servo surface and on a data surface as disclosed in U.S. Pat. No. 4,912,576, issued Mar. 27, 1990 to Donald W. Janz. In the method disclosed by Janz, a servo pattern is written to the servo surface while the actuator is against a stop and this pattern is then used to guide the actuator, with a radial offset, while a servo pattern is written to a data surface. The servo pattern on the data surface is then used to guide the actuator while a second servo pattern is written to the servo surface and the process continues until the servo surface is completely written with servo patterns. Alternatively, the actuator can be positioned with a rod that extends through a sealed hole in the housing. Thus, except for the need to make the dedicated servo surface inaccessible to the disk drive user with respect to writing, the inconvenience and cost of writing the servo patterns in a controlled environment is unnecessary.

SUMMARY OF THE INVENTION

The present invention provides a method and circuit that enables writing the servo patterns while the housing that encloses the disks, transducers and actuator is sealed without loss of the inaccessibility, for writing, to the dedicated servo surface by the user computer that is necessary to ensure integrity of the servo patterns on the dedicated servo surface. To this end, the invention exploits voltage limitations on power supplies found in computers to prevent writing to the dedicated servo surface by enabling such writing only when the power supply used to operate the disk drive provides a voltage that is higher than any voltage provided by a computer power supply. More particularly, the circuit of the present invention is comprised of a read amplifier and a switch assembly, both mounted within the sealed disk drive housing, that are operated from power supplied, via a ribbon connector assembly, from outside the housing and is further comprised of a read/write selection circuit, similarly located within the housing, that is sensitive to the applied power supply voltage to enable the switch assembly, and thereby provide a direct connection to the servo transducer, when the power supply voltage exceeds a selected level and to enable the read amplifier when the power supply voltage is below that level. Thus, writing to the dedicated servo surface can be enabled during manufacture of the hard disk drive by operating the drive from a power supply that provides a voltage level higher than levels used in computers and prevented after the hard disk drive has been mated to a computer by the lack of availability of a voltage level that will permit the switch assembly to make a direct connection to the servo transducer.

An object of the invention is to facilitate the writing of servo patterns to a dedicated servo surface of a hard disk drive at the time of manufacture of the drive while preventing writing to such surface after the drive has been installed in a computer.

Another object of the invention is to provide a fail-safe servo pattern writing method and circuit for a hard disk drive that prevents any possibility that a computer using the drive might overwrite the servo pattern written at the time of manufacture of the disk drive.

A further object of the invention is to facilitate the writing of servo patterns to a dedicated servo surface of a hard disk drive by eliminating the necessity of carrying out the writing in a clean environment.

Other objects, features and advantages of the present invention will become apparent from the following detailed description when read in conjunction with the drawings and appended claims.

DESCRIPTION OF THE PREFERRED EMBODIMENT

Figure 1:
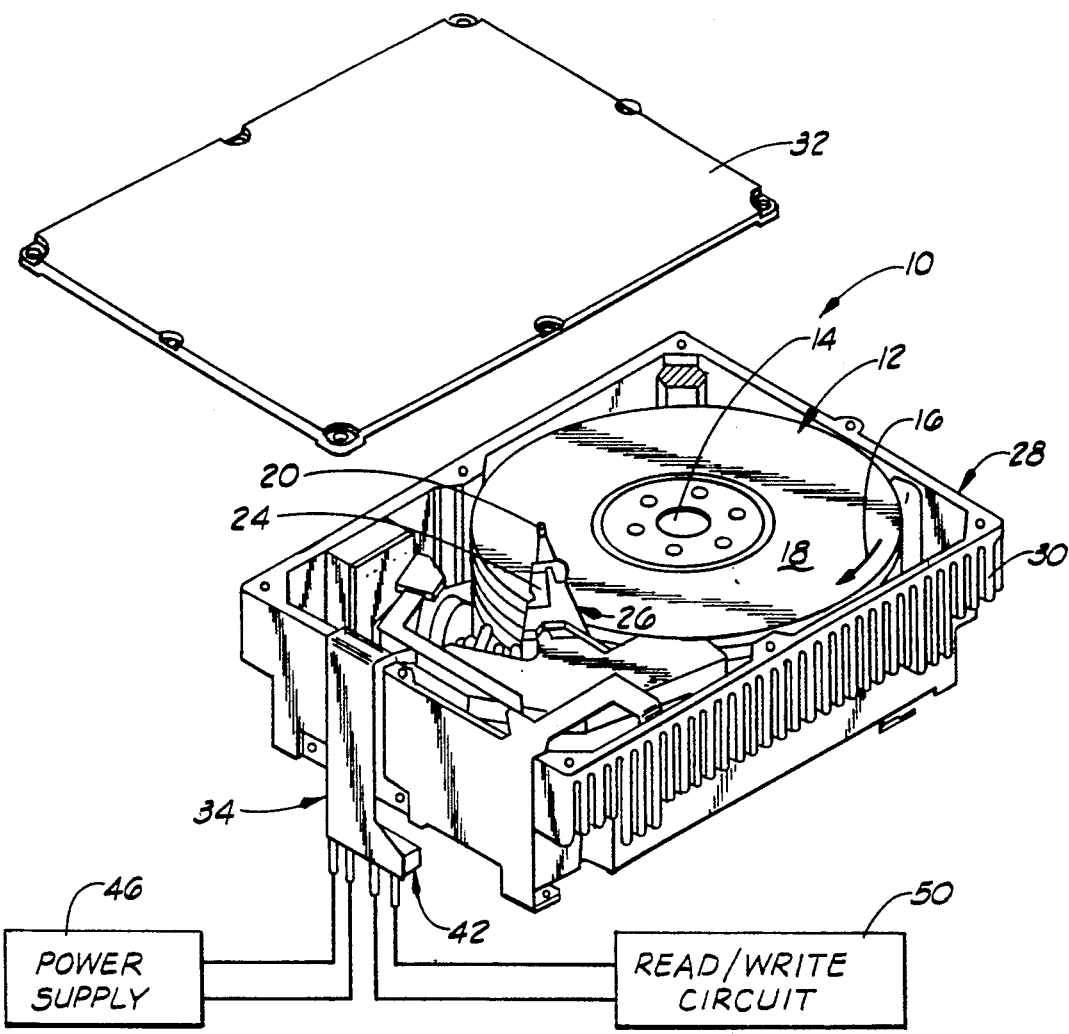
FIG. 1 is a perspective view of a typical hard disk drive in which the write enable circuit of the present invention can be emplaced for the practice of the selective reading and writing method of the present invention.

Referring now to the drawings in general and to FIG. 1 in particular, shown therein and designated by the general reference numeral 10 is a typical hard disk drive in which the present invention might be practiced. In general, the drive 10 is comprised of a stack of disks, only one of which has been numerically designated, at 12, in FIG. 1 that are mounted on a common spindle 14 for rotation by a motor (not shown) in the direction indicated at 16. The disks, which are commonly of aluminum, have magnetic coatings on their surfaces so that information can be written to the disks in the form of magnetized cells that extend along circular tracks defined on the surfaces of the disk. For purposes of discussion, it is contemplated herein that an upper surface 18 of the disk 12 is a dedicated servo surface which contains only servo information; for example, as disclosed in U.S. Pat. No. 4,811,135 issued Mar. 7, 1989 to Janz, the teachings of which are hereby incorporated by reference.

Reading of the servo patterns on the surface 18 is effected by a servo transducer 20 that includes a coil 22 (FIG. 3) in which an electromotive force is induced each time the transducer passes the boundary between two cells that are oppositely magnetized. Alternatively, writing to the surface 18 can be effected by passing a current through the coil 22 in a direction that will give rise to a magnetic field in the coating in a direction that will cause a cell to be magnetized in a selected one of either of two directions along a track on which the cells are located. The transducer 20 is mounted on an arm 24 of a conventional electromechanical actuator 26 that pivots in response to electrical signals supplied thereto from a servo circuit (not shown) that receives the emf pulses induced in the coil 22. The servo circuit and the operation thereof to acquire and subsequently follow a servo track defined on the surface 18 are conventional and need not be discussed for purposes of the present disclosure. Additional transducers (not shown), data transducers, are mounted on the actuator 26 to write data generated by a computer to data tracks defined on other surfaces of the disks and to subsequently read such data. The data and servo tracks are organized into cylinders so that data track acquisition and following can be accomplished by acquiring and subsequently following a servo track in the same cylinder as is conventional in the art.

As is further known in the art, the servo and data transducers are caused to "fly" above the surfaces of the disks, in close proximity thereto, by the movement of air, drawn into a swirling motion by the disks, between the transducers and the disk surfaces. Because of this close proximity between the disk surfaces and the transducers, it is important that the disk surfaces be substantially free of dust, smoke or other particles into which the transducers might crash during operation of the drive 10 and the drive 10 is, accordingly, assembled in a clean room and supplied to the user in a sealed housing 28 having a body portion 30, in which the disks and actuator are mounted, and a cover 32. A gasket (not shown), built into the underside of the cover 30, provides an airtight seal for the housing 28. Electrical connections are made to the transducers and to the actuator 26 via a ribbon connector assembly 34 that has been further illustrated in FIG. 2.

Figure 2:
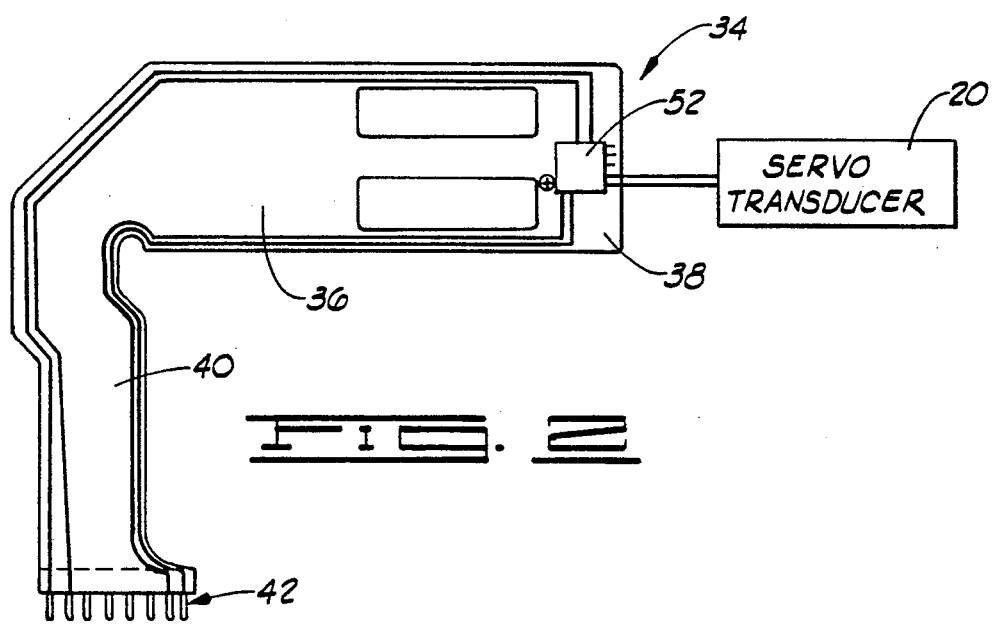
FIG. 2 is a top plan view of the ribbon conductor and connector assembly be means of which electrical signals are transmitted to and from the interior of the hard disk drive housing illustrating the placement of the write enable circuit in the hard disk drive of FIG. 1.

As shown in FIG. 2, the ribbon connector assembly 34 is comprised of a plastic strip having a central portion 36 that is mounted on a bracket (not shown) in the housing 28, a first end portion 38 that is mounted on the actuator 26, and a second end portion 40 that passes over the upper edge of one wall of the body portion 30 of the housing 28 as illustrated in FIG. 1 A conventional electrical connector 42 on the distal end of the second end portion 40 of the plastic strip is provided for making electrical connections to the transducers from a computer, other circuitry in the drive 10, or circuitry used to write the servo pattern as described above. In particular, and with respect to the present invention, the connector 42 is comprised of a pair of power jacks 44 (FIG. 3) that can be connected to a power supply 46 (FIG. 1), which may be part of a user's computer or part of apparatus used by the drive manufacturer to effect final preparation o the drive prior to shipment, and a pair of data jacks 48 (FIG. 3) by means of which electrical communication is established, as will be discussed below, between a read/write circuit 50 and the transducer coil 22. The read/write circuit 50 may be part of the disk drive 10, part of a computer, or part of manufacturing apparatus. In any event, the read/write circuit 50 is a conventional circuit that can be operated to supply data to be written to the dedicated servo surface 18 in the form of voltage levels or operated to read emf pulses from the transducer 20 for transmission to the servo circuit that controls the position of the actuator. Additional jacks are provided for the transmission of data to and from the data surfaces in a conventional manner.

Figure 3:
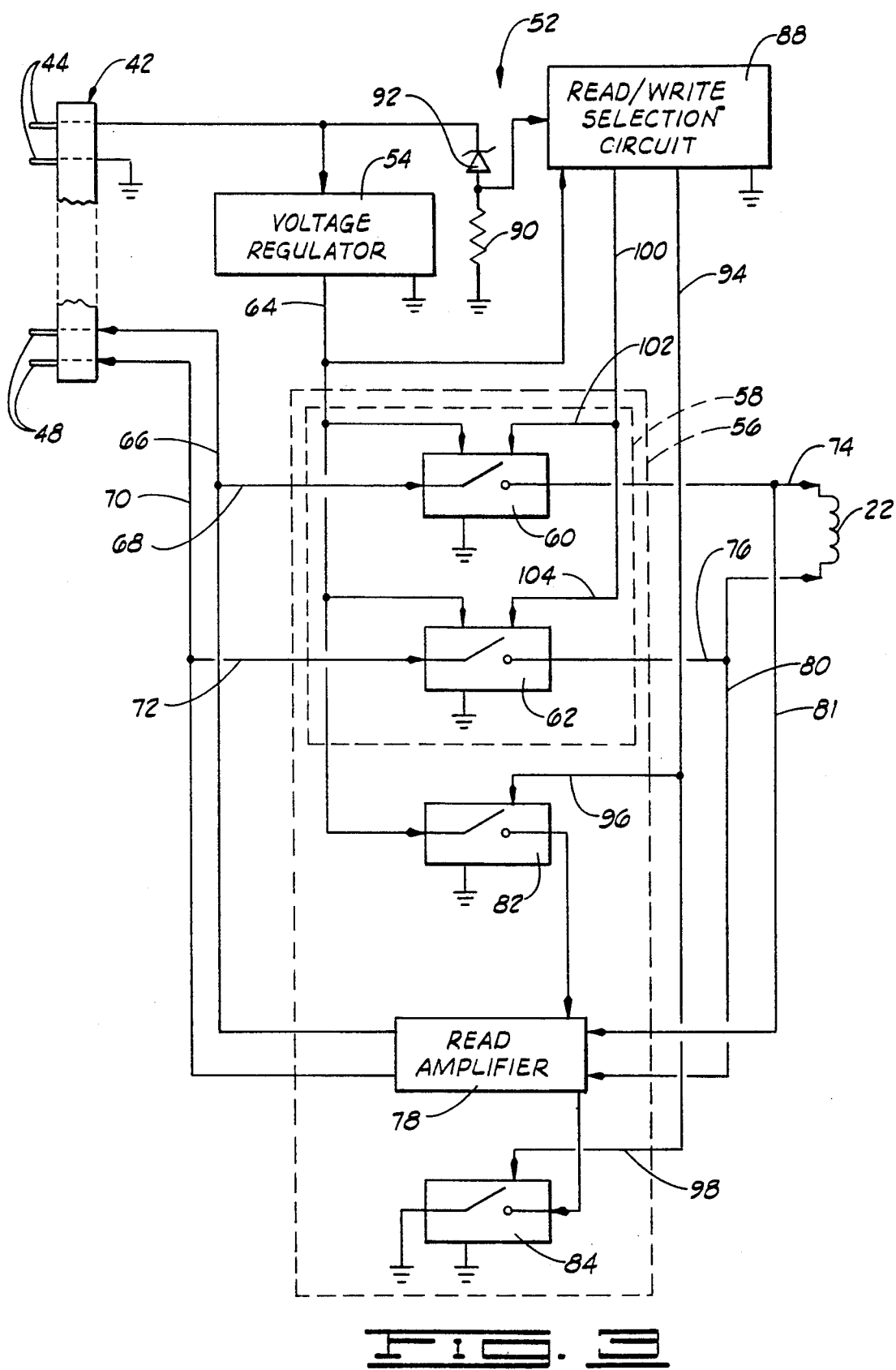
FIG. 3 is a schematic circuit diagram for the write enable circuit.

In one aspect, the present invention is comprised of a write enable circuit 52 which is schematically illustrated in FIG. 3. As shown in FIG. 2, the circuit 52 is mounted on the first end portion 38 of the plastic strip of which the ribbon connector assembly is comprised and electrical connections are made between the jacks 44 and 48 by conducting paths printed on the strip as shown in FIG. 2. (For clarity of illustration, additional conducting paths for providing electrical connections to data transducers and to the actuator have not been shown in the drawings.) The servo transducer 20 is electrically connected to the write enable circuit 52 as schematically indicated in FIG. 2 and as shown with respect to components of the circuit 52 in FIG. 3.

As shown in FIG. 3, one of the jacks 44 by means of which power is provided to the write enable circuit 52 forms a circuit ground to which components of the circuit 52 are connected and such components include a voltage regulator 54 which is connected between the system ground and the other of the jacks 44 to provide regulated power for operation of the write enable circuit 52. The circuit 52 is further comprised of a data transmission circuit 56 that is electrically connected between the jacks 48 and the coil 22 so that, in one state of the data transmission circuit 56 to be discussed below, currents provided by the read/write circuit 50 can be passed through the coil 22 to write servo patterns to the surface 18 while, in another state of the data transmission circuit 56, amplified emf pulses generated in the coil 22 by passage across the surface 18 can be transmitted to the read/write circuit 50.

To the first of these ends, the data transmission circuit 56 is comprised of a switch assembly 58 that is, in turn, comprised of two conventional bidirectional electronic switches 60 and 62 that can be closed by reception of a control signal as will be discussed below. Power for the switches 60, 62 is provided from the voltage regulator 54 via a conducting path generally indicated at 64 and the system ground. One end of switch 60 is connected to one of the data jacks 48 via conducting paths schematically indicated at 66 and 68 and the other of the data jacks 48 is similarly connected, as at 70 and 72, to one end of the switch 62. The opposite ends of the switches 60 and 62 are connected across to the coil 22 of the servo transducer 20, by conducting paths indicated at 74 and 76 so that servo patterns can be written to the dedicated servo surface 18 by closing the switches 60 and 62 and while appropriate electrical signals are supplied to the jacks 48 by the read/write circuit 50.

The data transmission circuit 56 is further comprised of a conventional differential read amplifier 78 having inputs connected to the coil 22 via conducting paths indicated at 80 and 81 and outputs connected to the jacks 48 via the conducting paths 66 and 70. Thus, at such time that power is supplied to the read amplifier 78, emf pulses induced in the coil 22 will be amplified and transmitted to the read/write circuit 50 via the jacks 48. Power is provided to the read amplifier 78 via an electronic switch 82, that can be closed by a control signal as will be discussed below and is connected between the read amplifier 78 and the conducting path 64 from the voltage regulator 54, and a switch 84 that is connected between the amplifier 78 and the system ground and is similarly closed by reception of a control signal. The present invention contemplates that the write enable circuit 52 will be implemented using large scale integration technology so that the read amplifier will be comprised of transistors and resistors formed on the surface of a silicon chip. In such case, the switches 82 and 84 can conveniently be formed by transistors that are placed in collector and emitter circuits of transistors that effect the amplification of the emf pulses.

In order to place the write enable circuit 52 into either of the two states referred to above, such circuit is further comprised of a read/write selection circuit 88 having an input that is connected to the junction of a grounded resistor 90 and a Zener diode 92, the anode of which is connected to the ungrounded jack of the pair 44. The read/write selection circuit 88 is a conventional level detector that provides a signal at one output when the voltage level at its input is greater than a fixed value and provides a signal at a second output when the input voltage is below that value. Thus, the read/write selection circuit 88 senses the voltage level of power supplied to the write enable circuit from the power supply 46 to provide a means for switching the write enable circuit 52 between the two states in accordance with the voltage level supplied to the circuit 52. Such switching is accomplished by a signal, referred to herein as a first control signal, that is transmitted to the switches 82 and 84 on conducting paths 94-98 at such times that the voltage supplied to the circuit 52 is below a preselected value, determined by the choice of the Zener diode 92, or, alternatively, by a signal, referred to herein as a second control signal, that is transmitted to the switches 60 and 62 on conducting paths 100-104 when the power supply voltage is greater than the preselected value.

In the spirit of providing a complete disclosure of the invention, it is noted that the placement of the write enable circuit 52 on the first end portion 38 of the plastic conducting strip provides a minimum of electrical conducting paths between the housing and the actuator consistent with a need to prevent corruption of the low signal levels induced in the coil 22 by stray signals and common mode noise. To this end, amplification of these signals is carried out as closely to the coil 22 as is practicable. Thus, the use of the voltage level of the power supplied to the write enable circuit to place such circuit in a selected one of the two states referred to above has the advantage of limiting conducting paths associated with the invention on the plastic conducting strip to just power and data paths to permit the width and, accordingly, stiffness of the strip to be minimized. Thus, flex bending forces exerted on the actuator by the strip can be minimized. These forces can be expected to increasingly complicate the servo problem that acquiring and following servo tracks presents to the engineer as the disks of hard disk drives become smaller and are rotated at higher speed so that the simplification of the servo problem provided by limiting the number of conducting paths that must be made between the actuator and the housing provides an additional advantage of using the present invention.

OPERATION OF THE WRITE ENABLE CIRCUIT

In order to discuss the operation of the write enable circuit 52 of the present invention, it will be useful to briefly consider the environment in which the hard disk drive 10 is used. Generally, the drive 10 is supplied to users of computers and has as its purpose the storage of files generated by a user computer. It may or may not be mounted within the case of the user computer but, in any event, it draws electrical power for its operation from the computer's power supply. Thus, the maximum voltage level that the circuit 52 can receive once it has been installed in a computer system is limited to the maximum voltage level that is provided by the computer power supply. Typically, this is 12 volts.

On the other hand, during manufacture of the hard disk drive, the manufacturer can provide whatever voltage level may be desired to the write enable circuit 52. For example, the manufacturer may provide power to the write enable circuit 52 at 27 volts. In the practice of the invention, it is contemplated that, at the time of manufacture of the disk drive, the power supply 46 will be a power supply selected by the manufacturer to provide electrical power at a relatively high voltage level; for example, 27 volts, that exceeds the preselected level necessary to cause the read/write selection circuit 88 to provide the second control signal on the conductor 100. This voltage level is transmitted to the write enable circuit 52 during writing of the servo patterns, by the read/write circuit 50 via the connector 42 to cause the read/write selection circuit 88 to provide a second control signal that closes switches 60 and 62. Hence, a direct electrical connection will be provided between the coil 22 and the data jack pair 48. At the same time, no first control signal will be provided to the switches 82 and 84 on the conducting paths 94-98 so that the read amplifier is, in effect, removed from the circuit between the coil 22 and the jack pair 48. Hence, currents supplied to the read enable circuit 52 at the jack pair 48 from the read/write circuit 50 are passed, via the switches 60, 62 through the coil 22 for writing a servo pattern on the dedicated servo surface 18.

Once the servo patterns have been written and the hard disk drive is supplied to a user, the power supply 46 will be the power supply of the user's computer which is incapable of providing the preselected voltage level that will cause the read/write selection circuit 88 to close the switches 60, 62. Thus, the switches 60, 62 remain open at all times that the hard disk drive 10 is mated to a computer to eliminate any direct connection between the jack pair and the transducer coil 22 that might result in overwritting of the servo patterns on the dedicated servo surface 18. Instead, the read/write selection circuit 88 will provide a first control signal to the switches 82 and 84 causing them to close and thereby transmit electrical power to the read amplifier 78. Hence, at all times that the hard disk drive is mated to a computer to store files generated thereby, the read amplifier will be in a powered up state in which emf pulses induced in the coil 22 are amplified and transmitted to the data jack pair 48 for subsequent transmission to the read/write circuit 50 for reading servo data from the surface 18. Thus, the operation of the write enable circuit 52 will be seen to be the provision of a direct connection between the read/write circuit 50 that is used by the manufacturer of the hard disk drive 10 during the writing of servo patterns with the read/write circuit 50 by simply providing power to the circuit 52 at a voltage above a preselected level and the provision of a read only connection between the coil 22 and the read/write circuit 50 that is used during reading of the servo patterns when the disk drive is installed in a user computer which provides power thereto at a voltage level below the preselected level.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A circuit for alternatively writing servo data to a dedicated servo surface of a hard disk drive and generating servo signals from servo data written to the dedicated servo surface, comprising:

first connecting means for connecting the hard disc drive to a power supply so as to provide electrical power for operating the hard disc drive;

read means, including a read/write transducer proximate the dedicated servo surface, for reading the servo data and providing servo signals indicative of the servo data at an output of the read means in response to a first control signal received by the read means;

switch means, connected between the output of the read means and the transducer of the read means, for transmitting signals received at the output of the read means to the transducer in response to a second control signal received by the switch means;

second connecting means for making electrical connections to the output of the read means; and read/write selection means connected to the first connecting means, the read means and the switch means, for providing the second control signal to the switch means at such times that electrical power is received at the first connecting means at a voltage level exceeding a preselected level and for providing the first control signal to the read means at such times that electrical power is received at the first connecting means at a voltage level below said preselected level.

2. In a hard disk drive used for storing computer files and operable from electrical power supplied at a maximum voltage level by a computer at electrical connectors of the disc drive, a method for writing servo data to a dedicated servo surface of the hard disk drive using a servo transducer positioned adjacent the dedicated servo surface, wherein the servo transducer is a read/write transducer and is positioned adjacent the dedicated servo surface for reading the dedicated servo surface and providing signals indicative of the servo data to a read amplifier whose output provides servo signals for positioning the transducer on the dedicated servo surface comprising the steps of:

providing operating power to the disk drive at said electrical connectors at a voltage level selected to exceed the maximum voltage level provided by said computer;

providing electrical signals corresponding to servo data to be written to the dedicated servo surface to the output of said amplifier;

sensing the voltage level of the operating power supplied to the disk drive at said electrical connectors; and in response to reception of operating power at said electrical connectors at a voltage level exceeding the maximum voltage level provided by said computer, transmitting the electrical signals provided at the read amplifier output to the servo transducer while disabling the read amplifier to thereby cause the servo transducer to write said servo data to the dedicated servo surface.

* * * * *